United States Patent [19]
Maddocks

[11] Patent Number: 5,945,638
[45] Date of Patent: Aug. 31, 1999

[54] APPARATUS FOR WEIGHING A PRODUCT

[75] Inventor: Keith Lever Maddocks, Sandy, United Kingdom

[73] Assignee: KMG Systems Limited, Sandy, United Kingdom

[21] Appl. No.: 08/848,694

[22] Filed: Apr. 28, 1997

[51] Int. Cl.$^6$ .......................... G01G 11/14; G01G 13/02; G01G 23/14
[52] U.S. Cl. ............... 177/16; 177/119; 177/164
[58] Field of Search ............... 177/16, 119, 145, 177/161, 162, 184, 187, 189, 164, 176, 235, DIG. 9

[56] References Cited

U.S. PATENT DOCUMENTS

| | | | |
|---|---|---|---|
| 2,266,906 | 12/1941 | Rapp | 177/119 |
| 2,954,969 | 10/1960 | McCullough et al. | 177/145 |
| 3,155,183 | 11/1964 | Bradford | 177/162 |
| 3,301,341 | 1/1967 | Fathauer | 177/184 |
| 3,578,094 | 5/1971 | Henry et al. | 177/119 |
| 4,489,797 | 12/1984 | Gordon | 177/187 |
| 5,191,948 | 3/1993 | Strickler | 177/184 |
| 5,696,354 | 12/1997 | Linville, Jr. et al. | 177/119 |

*Primary Examiner*—Randy W. Gibson
*Attorney, Agent, or Firm*—Oppenheimer Wolff & Donnelly LLP

[57] ABSTRACT

A weighing apparatus for weighing a flowable material being conveyed along a distribution system from a source downstream towards a user location, comprises a product carrying surface which has an upstream end and a downstream end, a first axis extending from the upstream end in the intended direction of product flow, and side walls upstanding on the product carrying surface. A base is also provided for supporting the product carrying surface. A support supports the product carrying surface on the base to allow flexing of the downstream end of the product carrying surface in a vertical direction about a second axis extending transversely of the first axis, in response to weight of product on the product carrying surface. A load cell monitors the amplitude of flexing of the product carrying surface and provides a signal representative of the weight of the product on the surface in dependence on the amplitude.

20 Claims, 5 Drawing Sheets

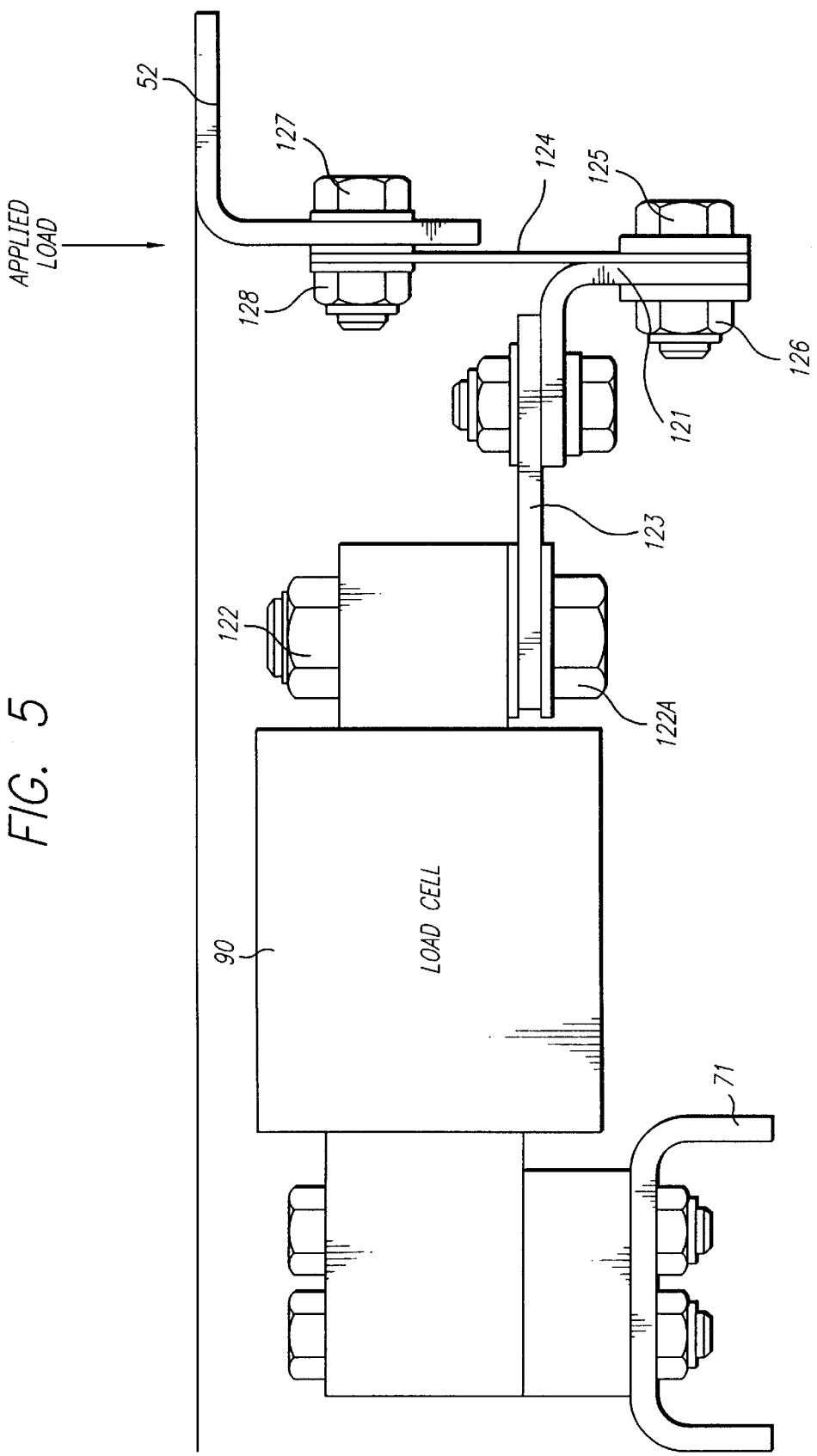

APPARATUS FOR WEIGHING A PRODUCT

BACKGROUND OF THE INVENTION

1. Field of the Invention

The present invention relates to an apparatus for weighing a product.

Distribution systems for conveying flowable material from a source to a user location are used, inter alia, for conveying bulk food products such as crisps, corn flakes and similar products of relatively low mass and irregular shape from a source such as an oven to a number of processing points. At these processing points the product is, for example, packaged by packaging machines which dispense metered quantities of the product to successively presented packages or containers.

One of the problems associated with such distribution systems is ensuring that the product flows uniformly along the distribution system and that product is delivered in the right quantities to the processing points.

2. Description of the Prior Art

A known apparatus for weighing the product comprises a vertically angled plate which is located in the distribution path and down which the product falls during its conveyance along the distribution path. The weight of the product falling down the inclined plate results in a force being applied to the inclined plate which is measured to provide an indication of the weight of the product flowing past the location. A disadvantage of this apparatus is that there is a tendency for the product to be damaged during its fall down the inclined plate.

The present invention seeks to provide an improved weighing apparatus.

BRIEF SUMMARY OF THE INVENTION

Accordingly, the present invention provides a weighing apparatus for weighing a flowable material being conveyed along a distribution system from a source, downstream towards a user location, the apparatus comprising:

- a product carrying surface having an upstream end and a downstream end, a first axis extending from said upstream end in the intended direction of product flow, and side walls upstanding on said product carrying surface;
- vibrating drive means for vibrating said base means and said product carrying surface in the direction of said first axis;
- base means for supporting said product carrying surface;
- support means supporting said product carrying surface on said base means to allow flexing of said downstream end of said product carrying surface in a vertical direction about a second axis extending transversely of said first axis, in response to weight of product on said product carrying surface;
- and measuring means for monitoring the amplitude of flexing of said product carrying surface and providing a signal representative of the weight of the product on said surface in dependence on said amplitude;
- wherein said measuring means comprises a load cell connected to said base means at one end and to said product carrying surface at a second end so as to vibrate therewith.

In a preferred form of weighing apparatus said support means supports said product carrying surface adjacent the upstream end thereof and counterbalance means are provided for counterbalancing the weight of the downstream end of the product carrying surface.

Conveniently, electromagnetic drive means are provided for vibrating said product carrying surface in the direction of said first axis.

The weighing apparatus may be supported on a base of an elongate primary conveyor section of the distribution system so as to be vibrated with the primary conveyor section by an electromagnetic drive means of the primary conveyor section.

The present invention is further described hereinafter, by way of example, with reference to the accompanying drawings, in which:

FIG. 5 is a side elevation showing an alternative arrangement for mounting the load cell of the apparatus shown in FIGS. 1 to 4.

Figure 1:
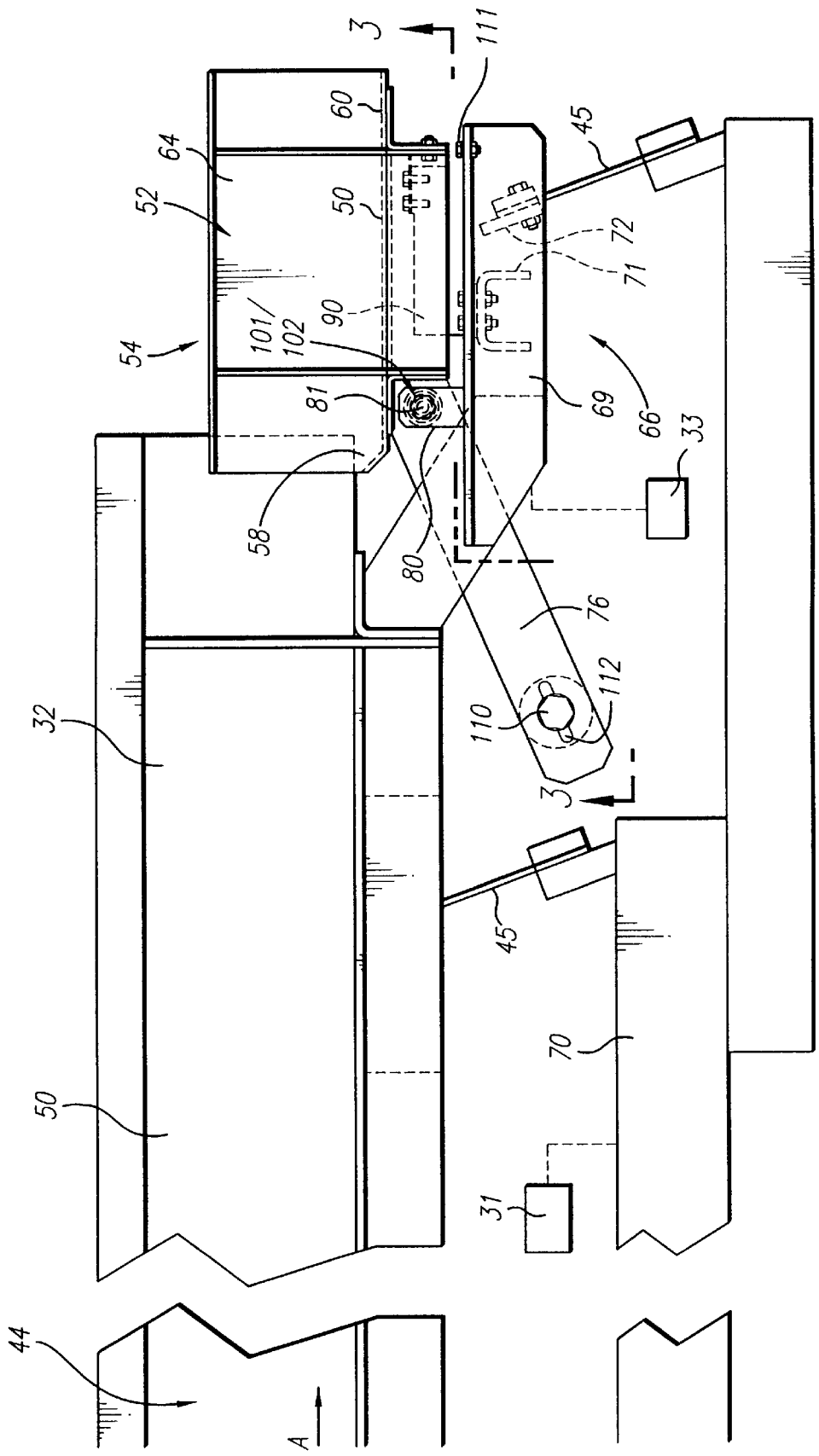
FIG. 1 is a side elevation of part of a distribution system for a food product incorporating a preferred form of weighing apparatus according to the present invention.
Figure 2:
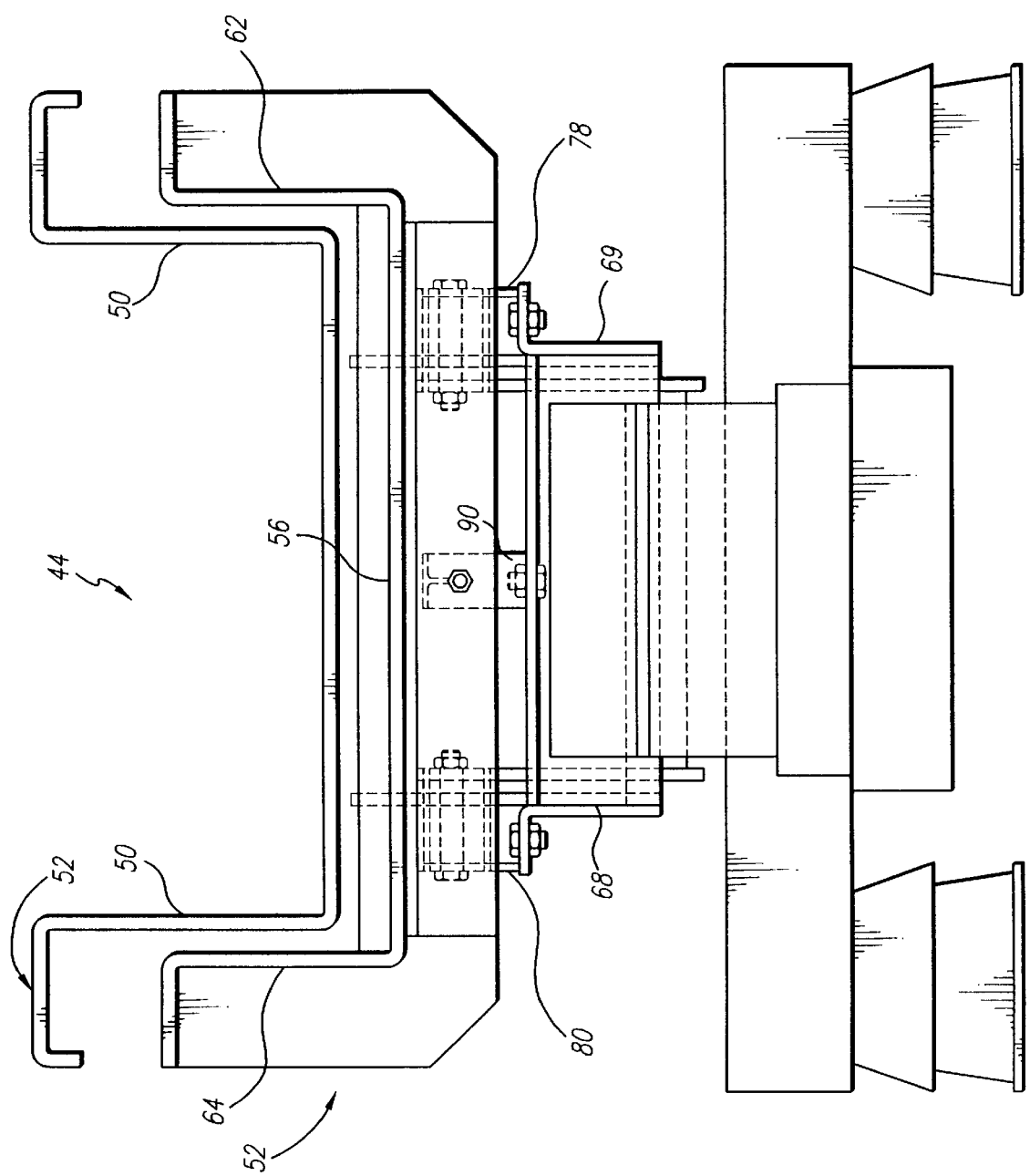
FIG. 2 is an end elevation of the weighing apparatus of FIG. 1 in the direction of arrow A of FIG. 1.
Figure 3:
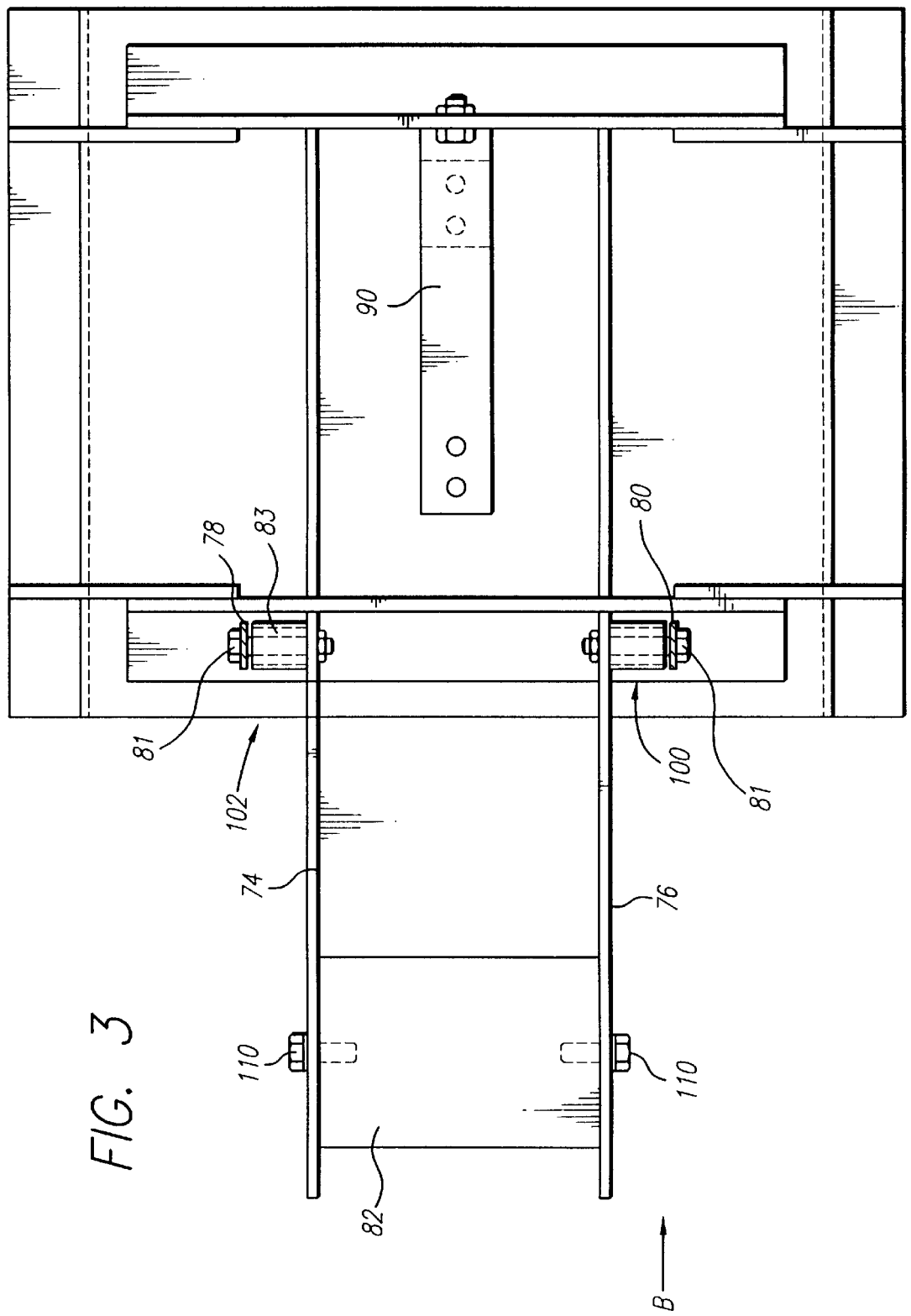
FIG. 3 is an inverse plan view of the weighing apparatus on the line A—A of FIG. 1.

In the drawings, FIG. 1 shows part of a distribution system which distributes a product such as crisps to, for example, packaging machines located at respective user locations. The product is conveyed from left to right as seen in FIG. 1 and the distribution system comprises a number of conveyor modules 32 which are arranged in nested form to provide a continuous flow path of product to the user locations. Only one conveyor module is shown in FIG. 1.

The conveyor module 32 comprises an elongate vibratory primary conveyor section which includes a product carrying tray 44. The tray is orientated with its longitudinal axis substantially horizontal and is supported on a base 70 by leaf springs 45 which allow movement of the tray relative to the base 70 longitudinally of the tray but resist movement of the tray 44 laterally of its axis relative to the base 70.

The tray also has side walls 50 and is open at its downstream end to allow product to fall from the tray 44 onto a tray 52 of a preferred form of weighing apparatus 54 according to the present invention.

A typical distribution system in which the preferred form of weighing apparatus 54 can be used is fully described in the applicants' earlier patent specification GB-A-2 257 408 the U.S. equivalent thereof being U.S. Pat. No. 5,207,310, and reference should be made thereto for further details.

The tray 52 of the weighing apparatus 54 is shown with its longitudinal axis extending in the same direction as the tray 44 and has a product carrying surface 56 with an upstream end 58 and a downstream end 60 and upstanding side walls 62, 64.

The downstream end edge of the tray 44 overlaps the upstream edge of the tray 52 to allow product to be carried onto the product carrying surface 56.

The tray 52 is supported on a base 66 formed by two parallel beams 68, 69 extending longitudinally of the tray. 52 and interconnected by one or more cross beams such as cross beams 71, 72.

Figure 4:
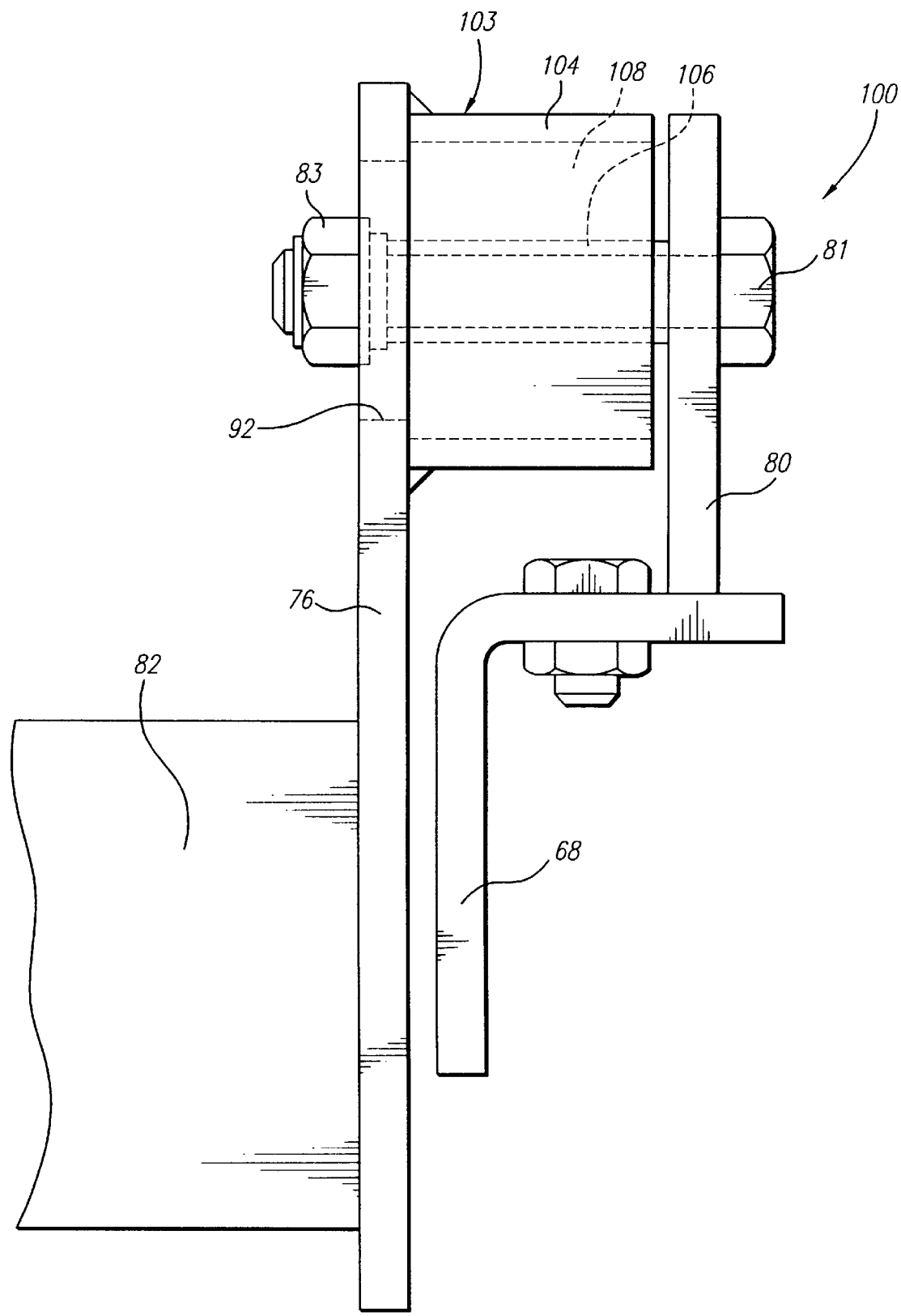
FIG. 4 is a view in the direction of arrow B of FIG. 3 of a pivot arrangement of the apparatus of FIG. 1.

The tray 52 has two parallel arms 74, 76 which are rigidly secured to and extend from the underside of the product carrying surface 56 adjacent the upstream end 58 in a downward and upstream direction. The arms 74, 76 adjacent the product carrying surface 56 are secured to upstanding flanges 78, 80 on the beams 68, 69 of the base 66 at the juncture of the arms 74, 76 by way of pivot arrangements 100, 102. The pivot arrangement 100 is shown in FIG. 4 in detail and comprises a bushing 103 which has an outer sleeve 104 of rigid material which is welded or otherwise secured to the arm 76. An inner sleeve 106 of the bushing is coaxial with the sleeve 104 and is also of rigid material. It has an axial length slightly greater than that of sleeve 104 such that it projects beyond the sleeve 104 at each end. The two sleeves 104, 106 are secured together by an intermediate sleeve 108 of a resilient material such as rubber, the sleeve 108 being glued or otherwise secured to the sleeves 104, 106.

The sleeve 106 is rigidly secured to the flange 80 by a bolt 81 and cooperating nut 83. The arm 76 is provided with a clearance hole 92 of sufficient diameter such that the nut 83 grips only the inner sleeve 106 whilst the bolt 81 grips the flange 80 between the sleeve 106 and the bolt head. The axis of the bolts extends conveniently at right angles to the longitudinal axis of the tray 52. The arrangement is such that the downstream end of the tray 52 can pivot about the axis of the bolts 81 as a result of torsional flexing of the rubber sleeve 108.

The weight of the tray 52 is counterbalanced by a counterbalance weight 82 which is mounted between the free ends of the arms 74, 76. As can be seen from FIG. 1, the counterbalance is secured to the arms 74, 76 by bolts I 10 which engage the counterbalance weight through axially extending slots 112. These slots allow the position of the counterbalance weight 82 along the axis of the arms 74, 76 to be adjusted to provide an accurate balancing of the tray 52. The counterbalance weight 82 is mounted such that a line extending through the centre of gravity of the counterbalance weight and the axis of the bolts 81 passes through the centre of gravity of the tray 52. This enables a dynamic balance of the tray to be achieved.

The downstream end region of the tray 52 is connected to the cross beam 71 of the base 66 by way of a load cell 90. The arrangement is such that vertical flexing of the downstream end 60 of the tray 52 exerts a force on the load cell 90 to produce an electrical signal representative of the amplitude of flexing of the tray 52. As will be appreciated, when product passes along the tray 44 onto the tray 52 the latter vibrates or flexes vertically about the axis of the bolts, generating a signal from the load cell 90. This signal is averaged conveniently over a ten second period to provide a signal representative of the weight of product passing across the tray 52. A screw 111 is provided on each beam 68, 69 to provide an adjustable safety stop to prevent excessive force being applied to the load cell 90.

It will be appreciated that the downstream end 60 of the tray 52 overlies an upstream end of a further tray in the distribution system to which product passes.

The counterbalance weight 82 and its position in slot 112 are chosen such that in the absence of any product on the tray 52 the output from the load cell 90 is substantially zero.

In FIG. 1 the base 66 of the weighing apparatus 54 is shown rigidly secured to the tray 44 and supported by a further leaf spring 45 so that the tray 52 is vibrated with the tray 44 in the intended direction of product flow by the electromagnetic drive 31 of the distribution system. It will be appreciated, however, that the weighing apparatus 54 can be a self-contained apparatus with its own electromagnetic drive 33 to provide the necessary vibration to move product from the upstream end 58 to the downstream end 60 of the tray 52.

A "dummy" load cell can also be provided on the base 66 to provide a reference output voltage which may be used in comparison with the output from the load cell to provide a difference signal again representative of the weight of product on the tray 52.

It will be seen that in the embodiment of the invention shown in FIGS. 1 to 4, the load cell 90 is rigidly attached at one end to the base 66 and at the other end is rigidly attached to the tray 52. Whilst this arrangement works perfectly well, the arrangement was found to be sensitive to temperature increases in the tray 52 which caused the load cell to be stretched longitudinally due to thermal expansion of the tray relative to the base 66.

Referring to FIG. 5, there is shown an alternative way of mounting the load cell 90 between the base 66 and the tray 52. In the arrangement shown in FIG. 5 the load cell 90 is bolted at one end to the cross beam 71 of the base 66 and is flexibly attached at the other end to a bracket 121. A long bolt 122 and nut 122A secure the load cell to a leaf spring in turn secured to the bracket 121. The bracket 121 is bolted to one end of a vertically extending leaf spring 124 by means of a bolt 125 and corresponding nut 126. The other end of the leaf spring 124 is bolted by means of bolt 127 and nut 128 to the tray 52. The leaf spring 123 alters the resonant frequency of the combined load cell and leaf spring such as to prevent the load cell resonating at the driving frequency of vibration. The leaf spring 123 also protects the load cell from damage as it allows the safety stops 111 to come into effect before the load cell is subject to excessive loads.

In operation of the arrangement shown in FIG. 5, vertical loads applied by tray 52 are transmitted to the load cell 90 through the leaf springs 124 and 123 whilst transverse movements of the tray 52 due to, for example, relative thermal expansions or contractions, cause the leaf spring 124 to flex and thereby isolate the load cell 90 from horizontal forces applied by movements of the tray 52 which would otherwise stretch or contract the load cell 90 longitudinally.

The stiffness of the leaf spring 123 is selected so that normally expected vertical loads applied by the tray 52 to the leaf spring 124 flex the leaf spring 123 to an extent which does not apply an excessive load to the load cell 90. At or above a threshold level of load the tray 52 contacts the stops 111 which thus prevent excessive loading of the leaf spring 123 and thereby protect the load cell 90 from damage due to accidental overloading.

The leaf spring 123 could be replaced by a resilient member such as a rubber block (not shown) which has sufficient stiffness to enable normally expected loads to be transmitted to the load cell 90 but will yield if excessive loads are applied.

Whilst it is preferred to interpose a resilient member such as the spring 123 between the load cell 90 and the tray 52 as shown in FIG. 5 in order to protect the load cell from excessive loading, the spring 123 could be omitted and the load cell 90 connected directly to the leaf spring 124 if desired.

I claim:

1. A weighing apparatus for weighing a flowable material being conveyed along a distribution system from a source, downstream towards a user location, the apparatus comprising:

a product carrying surface having an upstream end and a downstream end, a first axis extending from said upstream end in the intended direction of product flow, and side walls upstanding on said product carrying surface;

base means for supporting said product carrying surface;

vibratory drive means for vibrating said base means and said product carrying surface in the direction of said first axis;

support means supporting said product carrying surface on said base means to allow flexing of said downstream end of said product carrying surface in a vertical direction about a second axis extending transversely of said first axis, in response to weight of product on said product carrying surface;

and measuring means for monitoring the amplitude of flexing of said product carrying surface and providing a signal representative of the weight of the product on said surface in dependence on said amplitude;

wherein said measuring means comprises a load cell connected to said base means at one end and to said product carrying surface at a second end so as to vibrate therewith.

2. A weighing apparatus according to claim 1 wherein said support means supports said product carrying surface adjacent the upstream end thereof and a counterbalance means is provided for counterbalancing the weight of the downstream end of the product carrying surface.

3. A weighing apparatus according to claim 2 wherein the counterbalance means comprises a counterbalance weight mounted on a line extending through the centre of gravity of the counterbalance weight, the second axis, and the centre of gravity of the product carrying surface.

4. A weighing apparatus according to claim 2 wherein said vibratory drive means is an electromagnetic drive means.

5. A weighing apparatus according to claim 1 wherein said product carrying surface is constituted by a tray which is pivotally mounted on said base means for pivotal movement about said second axis by a pivot means comprising a first member attached to the base means, a second member attached to the tray and a torsionally resilient sleeve which interconnects the first and second members.

6. A weighing apparatus according to claim 2 wherein said product carrying surface is constituted by a tray which is pivotally mounted on said base means for pivotal movement about said second axis by a pivot means comprising a first member attached to the base means, a second member attached to the tray and a torsionally resilient sleeve which interconnects the first and second members.

7. A weighing apparatus according to claim 5 wherein said first and second members are sleeves.

8. A weighing apparatus according to claim 6 wherein said first and second members are sleeves.

9. A weighing apparatus according to claim 1 wherein the load cell is connected to the product carrying surface by way of a compressible resilient means for transmitting load to the load cell.

10. A weighing apparatus according to claim 7 wherein the load cell is connected to the product carrying surface by way of a compressible resilient means for transmitting load to the load cell.

11. A weighing apparatus according to claim 8 wherein the load cell is connected to the product carrying surface by way of a compressible resilient means for transmitting load to the load cell.

12. A weighing apparatus according to claim 1 wherein the load cell is connected to the product carrying surface by way of a compressible resilient means adapted to transmit vertical loads applied to the product carrying surface to the load cell but substantially to isolate the load cell from horizontal loads.

13. A weighing apparatus according to claim 7 wherein the load cell is connected to the product carrying surface by way of a compressible resilient means adapted to transmit vertical loads applied to the product carrying surface to the load cell but substantially to isolate the load cell from horizontal loads.

14. A weighing apparatus according to claim 8 wherein the load cell is connected to the product carrying surface by way of a compressible resilient means adapted to transmit vertical loads applied to the product carrying surface to the load cell but substantially to isolate the load cell from horizontal loads.

15. A weighing apparatus according to claim 14 wherein said compressible resilient means comprise leaf springs.

16. A weighing apparatus according to claim 1 wherein a safety stop is provided to limit the movement of the product carrying surface relative to the base means and thereby protect the measuring means from damage due to overloading.

17. A distribution system according to claim 12 wherein said resilient means comprise one or more leaf springs.

18. A distribution system for conveying flowable material from a source, downstream to a user location incorporating a weighing apparatus as claimed in claim 1 wherein:

said base means is a base of an elongate primary conveyor section of the distribution system and the weighing apparatus is supported thereon so as to be vibrated with the primary conveyor selection;

and said electromagnetic drive means is provided to vibrate both the primary conveyor section and the said product carrying surface in the direction of said first axis.

19. A distribution system according to claim 18 wherein the weighing apparatus is supported on the base by resilient means which allow movement of the product carrying surface relative to the base along said first axis but resist movement of the product carrying surface laterally of said first axis.

20. A system for weighing a flowable material, the system comprising:

at least one vibratory conveyor section for conveying said material from a source, downstream towards a user location:

vibratory drive means for vibrating said vibratory conveyor section;

and a weighing apparatus:

wherein the weighing apparatus comprises:

a product carrying surface having an upstream end and a downstream end, a first axis extending from said upstream end in the intended direction of product flow, and side walls upstanding on said product carrying surface;

base means for supporting said product carrying surface;

vibratory drive means coupled for vibrating said base means and said product carrying surface in the direction of said first axis;

support means supporting said product carrying surface on said base means to allow flexing of said downstream end of said product carrying surface in a vertical direction about a second axis extending transversely of said first axis, in response to weight of product on said product carrying surface;

and measuring means for monitoring the amplitude of flexing of said product carrying surface and providing a signal representative of the weight of the product on said surface in dependent on said amplitude;

wherein said measuring means comprises a load cell connected to said base means at one end and to said product carrying surface at a second end so as to vibrate therewith.

* * * * *